United States Patent Office 3,491,517
Patented Jan. 27, 1970

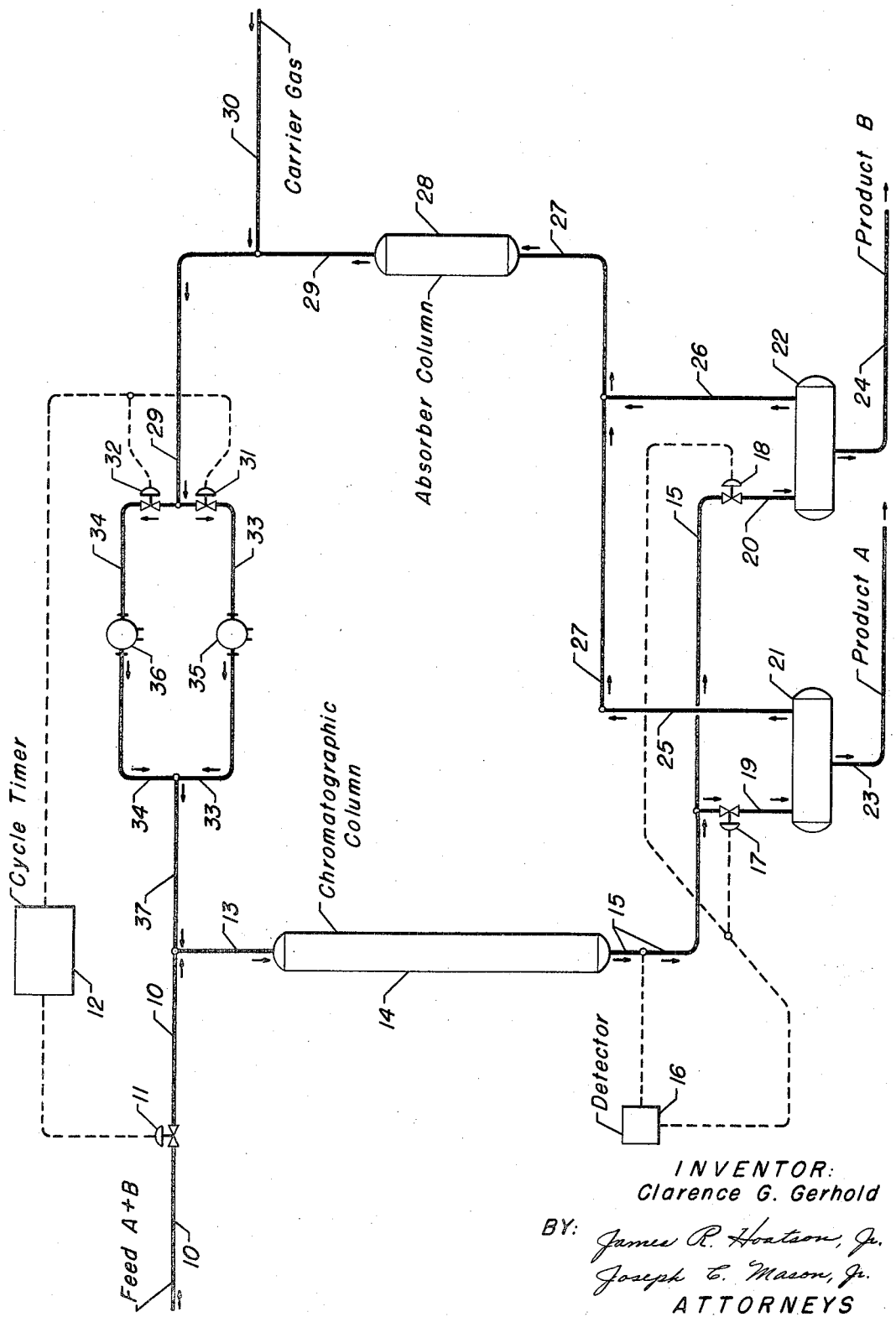

3,491,517
SEPARATION PROCESS
Clarence G. Gerhold, Palatine, Ill., assignor to Universal Oil Products Company, Des Plaines, Ill., a corporation of Delaware
Filed Aug. 2, 1967, Ser. No. 657,851
Int. Cl. B01d 15/08
U.S. Cl. 55—67
3 Claims

ABSTRACT OF THE DISCLOSURE

Process for separating a multi-component fluid mixture by chromatographic means. The process is applicable to the commercial scale separation of, say, hydrocarbon mixtures, such as benzene and hexane, in a packed column having a diameter in excess of 4 inches, and typically having a diameter from 1 to 2 feet.

BACKGROUND OF THE INVENTION

This invention relates to a process for separating fluid mixtures. It particularly relates to a process for separating hydrocarbon mixtures using a fixed bed of chromatographic separatory material.

It is well known in the art that a fluid mixture can be separated, particularly for analytical purposes, by partition chromatography, such as gas-liquid partition chromatography. In such a prior art process a sample of relatively volatile fluid mixture to be separated is injected into one end of a narrow column packed with an inert foraminous material on which has been deposited a coating of relatively high boliing partitioning liquid, such as dmethyl sulfolane, tricresyl phosphate, etc. The column is then purged or eluted with an inert carrier gas, such as helium. The components or fractions of the feed mixture partition between the gas phase in the vapor space and the liquid phase absorbed in the liquid coating on the solid particles. This partitioning effect causes the components of the mixture to move as bands of identifiable components toward the other end of the column with component band velocities which are less than the velocity of the carrier gas. The relative differences in velocities of the components is dependent upon what is commonly called the component partition coefficient which is defined for the purpose of this invention as the ratio of the concentration of the compound in the stationary liquid phase to the concentration of the same component in the moving gas phase. By utilizing the differences in partition coefficients which effects the different component velocities, the components of a feed mixture emerge, one by one, from the column in what are generally called "bands," usually in the order of boiling points for a homologus series. For analytical purposes, the separated components are detected as the bands emerge from the column by suitable detection means such as a thermal conductivity cell.

It is noted from the above description that such prior art process is typically a batch operation. However, while partition chromatography is useful for analyltical purposes, it is generally not applicable for large scale commercial purposes. Therefore, it is highly desirable to develop a continuous chromatographic process so that large scale operations could be performed. The prior art has recognized the desirability of commercializing the chromatographic column and, therefore, has devised in some instances a continuous process for this basically batch operation by switching the feed material from one battery of adsorption cases to another in cyclic fashion.

Another prior art method for achieving continuous operation is illustrated in U.S. Patent No. 2,893,955. In such prior art process, the solid particles coated with a partitioning liquid are continuously moved in cyclic fashion, with the feed material and carrier gas being introduced into the moving bed of particles at critical points along the cycle path. At appropriate points the carrier gas and the feed mixture components which have been separated are withdrawn from the moving stream of particles.

However, in all prior art efforts to achieve large scale operations with a chromatographic column there is the major difficulty of maintaining resolving and separatory ability as the diameter of the column increases. As those in the art well know, the scaling up of relatively small diameter laboratory chromatographic columns to relatively large diameter columns of 4 inches or more has failed to give comparative separation. While the reasons behind the failure of large diameter columns to perform satisfactory are not known, it is believed that at least one of the reasons is the inability to maintain the column under precise temperature control. Another reason, of course, could be the channeling of the fluid streams through the column, thereby contributing to inefficient or relatively poor contact between the separatory material and the fluid mixture to be separated.

SUMMARY OF THE INVENTION

Therefore, it is an object of this invention to provide a process for separating a multi-component fluid mixture by chromatographic means.

It is another object of this invention to provide a chromatographic separation process which is applicable to large scale commercial operations.

Accordingly, the present invention provides a process for separating a multi-component mixture which comprises: (a) introducing said mixture in intermittent manner according to a predetermined cycle into a separation zone containing a fixed foraminous body of separatory material selective for at least one component in said mixture; (b) continuously separating said mixture into component bands by passing through said zone an inert carrier fluid under conditions suitable for chromatographic separation; (c) heating said carrier fluid in intermittent manner responsive to said cycle sufficient to produce a heat wave which is passed through said zone; and, (d) recovering at least one of the separated components.

Another embodiment of the invention is the process hereinabove wherein said mixture and said carrier fluid are gas streams.

Still another embodiment of this invention is the process hereinabove wherein said zone is a chromatographic column having a diameter in excess of 4 inches.

A further embodiment of the invention provides an improvement in a large scale chromatographic separation process wherein a multi-component feed mixture is passed into a column having a diameter in excess of 4 inches, packed with separatory material, and wherein a carrier fluid is passed through said column under conditions sufficient to resolve said fluid mixture into bands of components which are recovered as separate product streams, which comprises passing said carrier fluid through said column as alternating bands of relatively hot carrier fluid and relatively cold carrier fluid whereby there is no substantial decrease in the temperature profile of said individual component bands.

The separatory material which may be employed in the chromatographic column or packed beds can be of any size or shape and may be composed of particulate matters such as fibers, etc. Examples of suitable solid materials include finely divided catalytic particles, alumina, natural and synthetic molecular sieves, charcoal, asbestos fibers, glass fibers, polymeric materials, elastomeric, plastic and resinous particles, ion exchange resins, clays, ceramics, rocks, vitreous material, and the like. In short, the solid separatory material can be any foraminous body of material which is selective for at least one component in the feed mixture. Other conventional separatory materials may be used for the stationary phase such as dimethyl sulfolane on firebrick, tricresyl phosphate on firebrick, palladium black on asbestos, etc. Thus, the separatory material is conventional and well known to those skilled in the art. For gas-liquid chromatography the most common solid material is ground firebrick of 30/50 or 50/80 mesh size having deposited thereon a suitable partitioning liquid.

The multi-component mixtures which are suitable for separation in accordance with the practice of this invention include virtually all mixtures which contain components having, for example, different relative volatilities. The invention is particularly applicable to the separation of hydrocarbon mixtures, such as benzene and hexane.

Suitable carrier fluid is also well known to those skilled in the art and for carrier gas streams illustrative examples include helium, nitrogen, hydrogen, etc. Preferably, in the practice of this invention, both the feed mixture and the carrier fluid are gas streams.

In addition to the advantages obtained by the imposition of a synchronous alternating heat wave on the chromatographic column, additional benefits may be obtained by the employment of baffles within the column which inhibit channeling and generally induce lateral fluid flow within the column. However, it is emphasized that with a properly designed column excellent resolution may be obtained on commercial scale columns without the use of such baffles.

The invention may be more fully understood from the description which follows with reference to the accompanying drawing which is a schematic representation of apparatus for practicing one embodiment of this invention.

DESCRIPTION OF THE DRAWING

Referring now to the drawing, a feed mixture comprising components A and B, such as benzene and hexane, enters the system via line 10. Control valve 11 is activated by cycle timer 12 on a predetermined cycle. As used herein, the term "cycle" may be based on any known physical measurement including time and/or volume; preferably, time is used. Cycle timer 12 is programmed to open and close control valve 11 in an intermittent manner so that the feed material in line 10 will pass into the system as plugs or bands of feed. Carrier fluid, e.g. helium gas, is continuously circulating through the system from line 37 wherefrom it mixes with the vaporized (by means not shown) feed material in line 10. The feed and carrier gas is passed via line 13 into chromatographic column 14 which is packed with a separatory material, such as dinonyl phthalate deposited on granular kieselguhr. The flowing carrier gas causes the resolution of the feed mixture in column 14 into a plurality of component bands generally corresponding to the number of components contained in the feed mixture.

Due to the different velocities of the component bands relative to the carrier gas, these bands leave column 14 sequentially via line 15 wherein the bands are detected by detector 16 which activates, respectively, control valves 17 and 18. For example, component A would be first detected by detector 16 which would close valve 18, open valve 17, and allow component A to flow via line 19 into receiver vessel 21. Similarly, component band B would be detected by detector 16 which would close valve 17, open valve 18, and allow component B to flow via line 20 into receiver vessel 22. Separated components A and B may then be removed from the system via lines 23 and 24, respectively.

The carrier gas is separated from the hydrocarbons and removed from receiver vessels 21 and 22 via lines 25 and 26, respectively, and in alternating fashion. The carrier gas is collected in line 27 and passed through adsorber column 28 for the removal therefrom of trace contaminants. The purified carrier gas is removed from adsorber column 29, admixed with makeup carrier gas, if any, from line 30 and passed into the programmed heating and cooling system, more fully discussed hereinafter.

Referring again to cycle timer 12, this timer activates control valves 31 and 32 in response to the cycle of opening and closing feed control valve 11. As the feed material passes into the system, control valve 31 is closed, control valve 32 is opened, allowing the carrier gas to pass via line 34 through heater 36 wherein it is heated to a relatively high temperature and in its heated condition passed via line 37 into chromatographic column 14 in intermittent manner. Following the programmed heating cycle, control valve 32 is closed and valve 31 is opened thereby allowing carrier gas to pass via line 33 through exchanger 35 for temperature control at a lower level than exchange 36 wherefrom carrier gas which is relatively cold is passed via line 33 and 37 into chromatographic column 14. It is to be noted that exchanger 35 may be either a heater for supplying a lesser amount of heat than exchanger 36 or may, in fact, be a cooler for significantly dropping or decreasing the temperature of the carrier gas which would then be intermittently passed in its cooled condition through column 14.

It is to be noted from this description that the present invention provides a method for imposing a band of alternating relatively hot and relatively cold carrier gas through the chromatographic column in response to the plugs of feed mixture which is also being passed through the column. It was discovered by the prior art that increasing the diameter of the chromatographic column decreased the sharpness of the separation which was achieved. In other words, the concentration profile of the component band would be relatively sharp on the returning edge of the band but would have a relatively long sloping tail on the trailing edge of the band. In most cases this long trailing edge overlapped the returning edge of the following component band thereby creating a relatively imprecise separation and ineffective operation.

The imposition of the heating wave on the column drastically sharpened the trailing edge concentration profile of the component band. This benefit is optimumly obtained by passing the heating band of carrier fluid through the column synchronously with at least one selected band of components in a manner such that the heated band overlapped the trailing edge of the selected component band. The controlled use of the heat wave requires that during elution there be no substantial decrease of the temperature profile accoss a band of component being eluted. Preferably, there will be a slight temperature increase during elution so that the velocity of elution will be substantially increased. On the other hand, the temperature of the bands leaving the column should be about the same as the temperature of the feed material to the column. Thus, to this latter extent the overall column can be said to be maintained under isothermal conditions. As used herein, the phrase "no substantial temperature decrease" is intended to embody equal temperature, increasing temperature, and slight, e.g. 2–3 degrees, decreasing temperature.

On method of predetermining the proper cycle both for feeding the column and for heating the carrier gas is to relate the overall separation efficiency to the overall operating temperature of the column. For example, the sharpness of the concentration gradient within a band is related to the overall operating temperature of the column and physical characteristics of the separatory material in the column. Similarly, the extent of the heating cycle both in degree and frequency depends on the relative heat capacities between the separatory material and the gaseous material in the vapor space of the column. Thus, for a properly designed column the only practical variable is overall temperature. After setting the overall temperature of the column, the heat wave is controlled by equating the percent of sensible heat in the vapor with the percent of the component in the vapor. If these percentages are equal, then the heat wave front and that particular band will have essentially the same velocity. In other words, the heat wave front is synchronized with one selected component band, preferably, the most volatile component.

The operating conditions for column 14 may be varied widely and depend, of course, on the environment maintained in the column. For example, on the benzenehexane feed mixture, the feed may enter the column at about 50° C., and the column is generally maintained at 20 p.s.i.g. pressure. Under these conditions and using firebrick coated with silicon oil, a sharp separation of these components may be obtained. The amount of heat which must be added to the carrier gas in accordance with this invention may also be varied widely, from 2° C. or 3° C. up to from 10° C. to 20° C. or more depending, of course, on the operating conditions necessary to achieve separation of the components. Those skilled in the art from the teachings presented herein may readily develop the correlations necessary to predict the temperature required of the carrier gas in order to maintain proper temperature conditions in the column.

PREFERRED EMBODIMENT

A preferred embodiment of the present invention includes the process for separating a hydrocarbon fluid mixture by chromatographic means which comprises the steps of: (a) passing said mixture into a packed chromatographic column maintained under separation conditions; (b) continuously introducing carrier fluid into said column in an amount sufficient to resolve said mixture into bands of identifiable hydrocarbon components; (c) alternately heating said carrier fluid in cyclic fashion prior to introduction into said column whereby a heated band of carrier fluid passes through the column synchronously with at least one selected band of said components, said heated band overlapping the trailing edge of said selected component band; (d) separating hydrocarbon component bands from the carrier fluid; and, (e) recovering at least one of said identifiable hydrocarbon components in high concentration.

Another preferred embodiment of the present invention includes the process hereinabove wherein said hydrocarbon mixture and said carrier are gas streams.

The invention claimed:

1. In a large scale chromatographic separation process wherein a multi-component feed mixture is passed into a column having a diameter in excess of 4 inches packed with separatory material and wherein a carrier fluid is passed through said column under conditions sufficient to resolve said fluid mixture into bands of components which are recovered as separate product streams, the improvement which comprises passing said carrier fluid through said column as alternating bands of relatively hot carrier fluid and relatively cold carrier fluid whereby there is no substantial decrease in the temperature profile of said individual component bands.

2. Improvement according to claim 1 wherein said multi-component feed mixture and said carrier fluid are gas streams.

3. Improvement according to claim 1 wherein said feed mixture comprises hydrocarbons.

References Cited

UNITED STATES PATENTS

| | | | |
|---|---|---|---|
| 3,111,835 | 11/1963 | Jenkins | 55—386 X |
| 3,250,058 | 5/1966 | Baddour | 55—67 |
| 3,366,149 | 1/1968 | Taft et al. | 73—23.1 X |
| 3,374,607 | 3/1968 | Fisher et al. | 55—67 |

JAMES L. DECESARE, Primary Examiner